United States Patent
Klusman

(10) Patent No.: US 9,657,594 B2
(45) Date of Patent: May 23, 2017

(54) GAS TURBINE ENGINE, MACHINE AND SELF-ALIGNING FOIL BEARING SYSTEM

(71) Applicant: Rolls-Royce Corporation, Indianapolis, IN (US)

(72) Inventor: Steven A. Klusman, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 716 days.

(21) Appl. No.: 14/141,399

(22) Filed: Dec. 26, 2013

(65) Prior Publication Data

US 2014/0271149 A1 Sep. 18, 2014

Related U.S. Application Data

(60) Provisional application No. 61/778,314, filed on Mar. 12, 2013.

(51) Int. Cl.
| | |
|---|---|
| *F01D 25/16* | (2006.01) |
| *F04D 29/057* | (2006.01) |
| *F16C 17/02* | (2006.01) |
| *F16C 23/04* | (2006.01) |

(52) U.S. Cl.
CPC ......... *F01D 25/164* (2013.01); *F04D 29/057* (2013.01); *F16C 17/024* (2013.01); *F16C 23/04* (2013.01); *F05D 2240/53* (2013.01); *F16C 2360/23* (2013.01)

(58) Field of Classification Search
CPC ...... F01D 25/164; F16C 23/04; F16C 17/024; F16C 2360/23; F04D 29/057; F05D 2240/53
See application file for complete search history.

(56) References Cited

U.S. PATENT DOCUMENTS

| | | | |
|---|---|---|---|
| 2,953,414 A | 9/1960 | Jerzy et al. | |
| 3,395,949 A | 8/1968 | Kun | |
| 3,542,441 A * | 11/1970 | Nixon | F16C 17/02 384/312 |
| 4,402,618 A | 9/1983 | Fortmann et al. | |
| 4,913,563 A * | 4/1990 | Veronesi | F04D 7/08 384/312 |

(Continued)

FOREIGN PATENT DOCUMENTS

| | | |
|---|---|---|
| EP | 903510 B1 | 7/2005 |
| EP | 2305983 | 6/2011 |
| WO | 2009088955 A2 | 7/2009 |

OTHER PUBLICATIONS

International Search Report for PCT International Application Serial No. PCT/US2013/077895, completed May 8, 2014, (10 pages).

*Primary Examiner* — Craig Kim
*Assistant Examiner* — Eldon Brockman
(74) *Attorney, Agent, or Firm* — Barnes & Thornburg, LLP

(57) ABSTRACT

One embodiment of the present invention is a unique gas turbine engine. Another embodiment is a unique machine. A further embodiment is a unique self-aligning foil bearing system. Other embodiments include apparatuses, systems, devices, hardware, methods, and combinations for machines and self-aligning foil bearing systems. Further embodiments, forms, features, aspects, benefits, and advantages of the present application will become apparent from the description and figures provided herewith.

20 Claims, 2 Drawing Sheets

(56) References Cited

U.S. PATENT DOCUMENTS

| | | | | |
|---|---|---|---|---|
| 5,054,938 | A | * | 10/1991 | Ide .......................... F16C 17/03 |
| | | | | 384/117 |
| 5,603,574 | A | * | 2/1997 | Ide ........................ F01D 25/164 |
| | | | | 384/117 |
| 5,660,481 | A | * | 8/1997 | Ide ........................ F16C 17/035 |
| | | | | 384/122 |
| 6,948,853 | B2 | | 9/2005 | Agrawal |
| 7,535,150 | B1 | | 5/2009 | Wilson |
| 7,658,545 | B2 | | 2/2010 | Dubreuil et al. |
| 7,836,601 | B2 | * | 11/2010 | El-Shafei ................ F16C 17/02 |
| | | | | 29/407.09 |
| 2005/0095772 | A1 | | 5/2005 | Ishikawa |
| 2005/0275300 | A1 | * | 12/2005 | El-Shafei ................ F16C 17/02 |
| | | | | 310/90.5 |
| 2011/0255963 | A1 | | 10/2011 | Kim |

* cited by examiner

GAS TURBINE ENGINE, MACHINE AND SELF-ALIGNING FOIL BEARING SYSTEM

CROSS REFERENCE TO RELATED APPLICATIONS

This application claims priority to and the benefit of U.S. Provisional Patent Application No. 61/778,314, filed 12 Mar. 2013, the disclosure of which is now expressly incorporated herein by reference.

TECHNICAL FIELD

The present invention relates to machines having rotors, including gas turbine engines, and more particularly, to a self-aligning foil bearing system for such machines.

BACKGROUND

Foil bearing systems that effectively handle misalignment remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique machine. A further embodiment is a unique self-aligning foil bearing system. Other embodiments include apparatuses, systems, devices, hardware, methods, and combinations for machines and self-aligning foil bearing systems. Further embodiments, forms, features, aspects, benefits, and advantages of the present application will become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
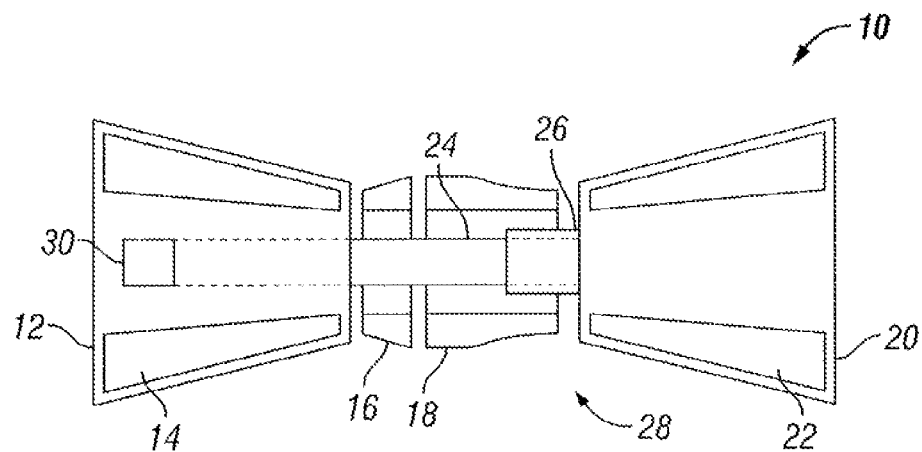
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular, FIG. 1, some aspects of a non-limiting example of a machine 10 in accordance with an embodiment of the present invention is schematically depicted. Machine 10 may be any machine having one or more rotating components. In one form, machine 10 is a gas turbine engine, and hence, may be referred to herein as gas turbine engine 10. In one form, gas turbine engine 10 is an axial flow machine, e.g., an air-vehicle power plant. In other embodiments, gas turbine engine 10 may be a radial flow machine or a combination axial-radial flow machine. It will be understood that the present invention is equally applicable to various gas turbine engine configurations, for example, including turbojet engines, turbofan engines, turboprop engines, and turboshaft engines having axial, centrifugal and/or axi-centrifugal compressors and/or turbines.

In one form, gas turbine engine 10 includes a compressor 12 having a plurality of blades and vanes 14, a diffuser 16, a combustor 18, a turbine 20 having a plurality of blades and vanes 22, and a shaft 24 coupling compressor 12 with turbine 20.

Combustor 18 is in fluid communication with compressor 12 and turbine 20. Turbine 20 is drivingly coupled to compressor 12 via shaft 24. Turbine 20 is supported radially by a self-aligning foil bearing system 26. Although only a single spool is depicted, it will be understood that the present invention is equally applicable to multi-spool engines. The number of stages of blades and vanes 14 of compressor 12, as well as the number of blades and vanes 14 in any given stage; and the number of stages of blades and vanes 22 of turbine 20, as well as the number of blades and vanes 22 in any given stage, may vary with the application, e.g., with the power output and/or other requirements of a particular application. In various embodiments, gas turbine engine 10 may include one or more fans, additional compressors and/or additional turbines.

During the operation of gas turbine engine 10, air is received at the inlet of compressor 12. Blades and vanes 14 compress the air received at the inlet of compressor 12. Diffuser 16 is positioned downstream of compressor 12. Diffuser 16 reduces the velocity of the pressurized air discharged from compressor 12. After having been compressed and diffused, the air is discharged from diffuser 16 into combustor 18. The pressurized air is then mixed with fuel and combusted in combustor 18. The hot gases exiting combustor 18 are directed into turbine 20. Turbine 20 extracts energy from the hot gases to, among other things, generate mechanical shaft power to drive compressor 12 via shaft 24.

Compressor 12, turbine 20 and shaft 24 form a rotor 28. Although shaft 24 and rotor 28 are described herein as with respect to a gas turbine engine, it will be understood that in other embodiments, shaft 24 may be any shaft of any type of machine 10, and rotor 28 may be a rotor of any machine 10, the latter of which may or may not include a shaft. In one form, shaft 24 is coupled to both compressor 12 and turbine 20. In other embodiments, shaft 24 may be coupled to only one of compressor 12 and turbine 20, and may be integral with the other. In still other embodiments, shaft 24 may be integral with both compressor 12 and turbine 20. In one form, the hot gases exiting turbine 20 are directed into a nozzle (not shown), and provide a thrust output for gas turbine engine 10. In other embodiments, additional compressor and/or turbine stages in one or more additional rotors upstream and/or downstream of compressor 12 and/or turbine 20 may be employed, e.g., in single or multi-spool gas turbine engines.

Self-aligning foil bearing system 26 is operative to react rotor 28 loads, and to transmit the rotor loads from rotor 28 to another structure. In one form, foil bearing system 26 is operative to react and transmit loads from rotor 28 to a static engine structure. In other embodiments, foil bearing system 26 may be operative to react and transmit loads from a rotor to another component, which may include another rotor, e.g., wherein foil bearing system 26 is an inter-shaft bearing configured to transmit loads from one rotor to another rotor. Rotor loads may include radial and thrust loads resulting from rotor weight and inertial loading, as well as pressure/thrust loading and dynamic/vibratory/rotor imbalance loading. In the illustrated example, foil bearing system 26 reacts radial loads from turbine 20, whereas another bearing system 30 supports compressor 12 and reacts other rotor 28 radial loads, and reacts rotor 28 thrust loads. In other embodiments, foil bearing system 26 may support compressor 12 in addition to or in place of turbine 20. In one or more of various embodiments, foil bearing system 26 may be configured to react radial and/or thrust loads for all or part of any rotor system of a gas turbine engine such as engine 10, or any rotor system of any machine.

Figure 2:
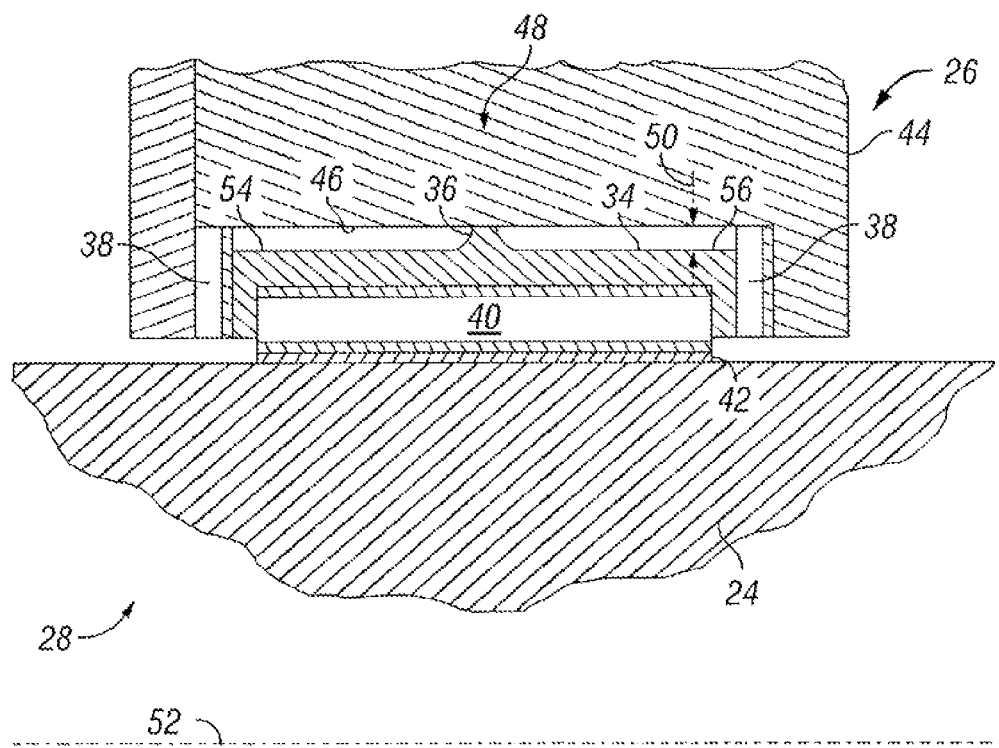
FIG. 2 schematically illustrates a cross-sectional view of some aspects of a non-limiting example of a self-aligning foil bearing system in accordance with an embodiment of the present invention.
Figure 3:
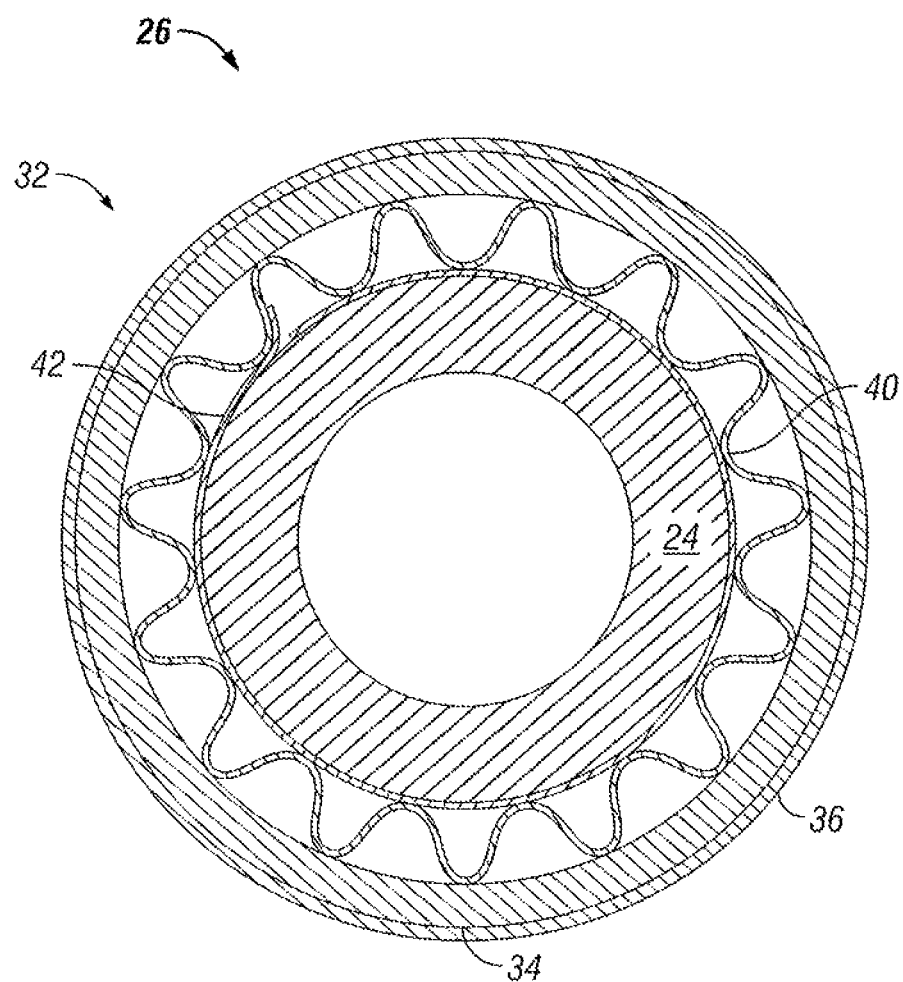
FIG. 3 schematically illustrates a cross-sectional view of some aspects of a non-limiting example of the self-aligning foil bearing system of FIG. 2.

Referring to FIGS. 2 and 3, some aspects of a non-limiting example of self-aligning foil bearing system 26 in accordance with an embodiment of the present invention is schematically depicted. Foil bearing system 26 includes a foil bearing 32, a housing 34, a fulcrum 36 and a plurality of axial springs 38. Self-aligning foil bearing system 26 is operative to align foil bearing 32 with the axis of rotation of rotor 28.

Foil bearing 32 is a gas bearing. In one form, foil bearing 32 is a compliant foil air bearing. In other embodiments, foil bearing 32 may not be a compliant foil bearing and/or may operate with one or more gases other than air. In one form, foil bearing 32 is configured as a radial bearing. In other embodiments, foil bearing 32 may be configured as a thrust bearing in addition to or in place of being configured as a radial bearing. In one form, foil bearing 32 includes a bump foil 40 and a hydrodynamic foil, referred to herein as a top foil 42. In some embodiments, a plurality of bump foils 40 and top foils 42 may be employed in foil bearing 32, e.g., immediately adjacent to each other or spaced apart from each other. In some embodiments, only a single bump foil 40 and top foil 42 may be employed. In one form, top foil 42 is preloaded against rotor 28, e.g., using a spring (not shown). In other embodiments, top foil 42 may not be preloaded, or may be preloaded by virtue of the shape of top foil 42 and/or bump foil 40. Other types of foil bearings may be used in other embodiments. Bump foil 40 and top foil 42 are disposed within housing 34.

Shaft 24 of rotor 28 forms a journal employed by foil bearing 32. Rotation of rotor 28 generates a hydrodynamic air film between rotor 28 and top foil 42. The hydrodynamic air film thickness and the load bearing capacity of foil bearing 32 increase with the rotational speed of rotor 28. During startup of engine 10, top foil 42 rubs against shaft 24 until the hydrodynamic air film pressure is sufficient to overcome the supported rotor 28 loads and any preload. At normal operating speeds, the hydrodynamic air film separates rotor shaft 24 and top foil 42, thereby preventing contact between shaft 24 and top foil 42 during normal engine operation. The hydrodynamic air film supports engine rotor 28. Rotor 28 loads are transmitted through the hydrodynamic air film to top foil 42. Top foil 42 is supported by bump foil 40, which transmits the loads to housing 34, and also provides additional compliance to foil bearing 32. The loads are transmitted from housing 30 to an engine 10 static structure 44 via fulcrum 36. In other embodiments, the loads may be transmitted to other components, rotating and/or stationary.

Housing 34 is configured to receive foil bearing 32. Housing 34 is also configured to be at least partially received in a bearing pilot feature 46 of static structure 44. Bearing pilot feature 46 is configured to pilot a bearing system. In one form, bearing pilot feature 46 is a cylindrical opening in static structure 44. In other embodiments, bearing pilot feature 46 may take other forms. In the depicted embodiment, housing 34 is received entirely within bearing pilot feature 46. In other embodiments, housing 34 may be only partially received within bearing pilot feature 46. In one form, housing 34 is anti-rotated by an anti-rotation feature (not shown). In other embodiments, housing 34 may be anti-rotated by other means, including via friction generated by axial springs 38. Housing 34 supports bump foil 40, which supports top foil 42. Bump foil 40 provides compliance to foil bearing 32, e.g., in the event engine rotor 28 impacts foil bearing 32. Top foil 42 supports the hydrodynamic air film that supports engine rotor 28. In one form, foil bearing system 26 is disposed around shaft 24 to react rotor 28 loads via shaft 24. In other embodiments, foil bearing system 26 may be positioned to react loads directly from compressor 12 and/or turbine 20 directly. In one form, foil bearing system 26 is positioned adjacent to turbine 20 in order to react turbine 20 loads and transmit the loads to a static engine structure 44. In other embodiments, foil bearing system 26 may be positioned adjacent to compressor 12 or in other locations to react and transmit loads from compressor 12 and/or other rotating components of engine 10. In still other embodiments, foil bearing system 26 may react and transmit rotor loads from one rotor to another rotor of a gas turbine engine.

Fulcrum 36 is disposed radially between housing 34 and bearing pilot feature 46. Fulcrum 36 is configured to pilot housing 34 within bearing pilot feature 46, e.g., to position housing 34 center-wise within bearing pilot feature 46. In addition, fulcrum 36 is configured to form a pivot for housing 34 for pivoting housing 34 relative to bearing pilot feature 46, e.g., to accommodate misalignment of foil bearing 32 and housing 34 relative to shaft 24. For example, in order to function as a pivot, fulcrum 36 may be relatively narrow in some embodiments, while maintaining sufficient axial thickness to keep stress levels and wear rates resulting from radial loads within acceptable limits. In one form, fulcrum 36 is formed integrally with housing 34. In other embodiments, fulcrum 36 may be a stand-alone component, or may be integral with static structure 44, e.g., as part of bearing pilot feature 46.

In one form, fulcrum 36 is disposed at a central portion 48 of housing 34, e.g., the middle of housing 34. In other embodiments, fulcrum 36 may be disposed at any location commensurate with the needs of the application. In embodiments where housing 34 is asymmetric relative to foil bearing 32, fulcrum 36 may be disposed approximately halfway between the axially fore and aft ends of foil bearing 32, or may be disposed at other locations commensurate with the needs of the application. Fulcrum 36 is configured to maintain a predetermined gap or distance 50 between housing 34 and bearing pilot feature 46. In some embodiments, fulcrum 36 may also be configured to mute vibratory inputs into housing 34. Predetermined distance 50 is selected to limit an angular position change of housing 34, e.g., in the event dynamic or other loading conditions cause rotor 28 axis of rotation 52 to become skewed. The angular position change is limited by contact of housing 34 with static structure 44 at pilot feature 46, e.g., at a forward outer diametral portion 54 of housing 34 and/or at an aft outer diametral portion 56 of housing 34.

Axial springs 38 are configured to impart an axial load on housing 34, and to generate a predetermined radial frictional damping characteristic of housing 34, that is, radial friction that provides Coulomb damping of housing 34 in response to excursions of housing 34, e.g., due to excursions of shaft 24. The excursions may be angular and/or radial. Any angular excursion of housing 34 results in a radial excursion for at least one side of housing 34, depending upon, for example, the axial position of fulcrum 36 relative to housing 34, and the radial clearance between fulcrum 36 and bearing pilot feature 46.

In addition, axial springs 38 are configured to prevent angular motion of housing 30 (in planes perpendicular to the axis of rotation), until predetermined frictional forces are exceeded. The predetermined radial frictional damping characteristic and the predetermined frictional forces are selected, depending on, for example, the anticipated or measured dynamic response of rotor 28, the loads experienced during rotor excursions at subcritical and/or supercritical rotor frequencies, the compliance of foil bearing 32 and/or other engine components, and the like. The predetermined radial frictional damping characteristic and the predetermined frictional forces are functions of, among other things, the spring rate of axial springs 38; the preload of installed axial springs 38; the wear surface area of axial springs 38; and the static and kinetic friction characteristics at the interfaces between actual springs 38 and housing 34; and/or the interfaces between axial springs 38 and static structure 44.

In one form, two axial springs 38 are employed, acting oppositely to each other, one acting at each axial end of housing 34. In other embodiments, only a single axial spring may be employed. In still other embodiments, more than two axial springs may be employed. In various embodiments, one or more axial springs may be positioned to act on any suitable portion of housing 34. In one form, axial springs 38 are in the form of axial wave washers. In other embodiments, other spring types may be employed. In one form, axial springs 38 are positioned at each end of bearing housing 34, and act directly thereon. In other embodiments, other components may be interposed between the axial spring(s) 38 and housing 34.

The operation of foil bearing 32 is dependent upon maintaining the hydrodynamic air film between rotor 28 and top foil 42 to prevent contact between rotor 28 and top foil 42 during normal engine 10 operation. In order to generate the hydrodynamic air film, it is preferable that the axis of rotation of rotor 28 be aligned with the geometric centerline of foil bearing 32, e.g., so that the hydrodynamic loading on top foil 42 and the air film thickness are generally uniform along the operating length of bearing 32, e.g., the left to right direction in the depiction of FIG. 2. Axial springs 38 hold housing 34 and foil bearing 32 against angular deflection until the frictional forces are exceeded. When the frictional forces are exceeded, housing 34 pivots about fulcrum 36, aligning foil bearing 32 with rotor 28, e.g., shaft 24. During dynamic excursions, the frictional forces provide Coulomb damping to damp the vibratory load imposed by rotor 28 onto housing 34 via foil bearing 32.

Embodiments of the present invention include a gas turbine engine, comprising: a compressor; a turbine; a static structure having a bearing pilot feature configured to pilot a bearing system; and a self-aligning foil bearing system operative to transmit rotor loads from at least one of the compressor and the turbine to the static structure, wherein the foil bearing system includes: a foil bearing; a housing configured to receive the foil bearing and configured to be at least partially received within the bearing pilot feature; a fulcrum disposed between the housing and the bearing pilot feature; and an axial spring configured to impart an axial load on the housing and to generate a predetermined radial frictional damping characteristic of the housing, wherein the self-aligning foil bearing system is operative to align the foil bearing with an axis of rotation of the at least one of the compressor and the turbine.

In a refinement, the fulcrum is positioned in a central portion of the housing.

In another refinement, the fulcrum is configured to offset the housing from the bearing pilot feature a predetermined distance.

In yet another refinement, the predetermined distance is selected to limit an angular position change of the housing.

In still another refinement, the angular position change of the housing is limited by contact of the housing with the bearing pilot feature.

In yet still another refinement, the predetermined radial frictional damping characteristic is selected to limit a dynamic excursion of the housing.

In a further refinement, the fulcrum is configured to form a pivot for the housing for pivoting the housing relative to the bearing pilot feature.

In a yet further refinement, the axial spring is configured to prevent angular motion until predetermined frictional forces are exceeded.

In a still further refinement, the bearing pilot feature is a cylindrical opening in the static structure.

Embodiments of the present invention include a machine, comprising: a rotor; a component having a bearing pilot feature; a self-aligning foil bearing system operative to transmit rotor loads from the rotor to the component, wherein the foil bearing system includes: a foil bearing; a housing configured to receive the foil bearing and configured to be at least partially received within the bearing pilot feature; a fulcrum disposed between the housing and the bearing pilot feature; and a spring configured to impart a load on the housing and to generate a predetermined frictional damping characteristic of the housing, wherein the self-aligning foil bearing system is operative to align the foil bearing with an axis of rotation of the rotor.

In a refinement, the machine further comprises another spring configured to act on the housing oppositely to the spring.

In another refinement, the housing has a first face and a second face; and wherein the spring acts against the first face and the other spring acts against the second face.

In yet another refinement, the foil bearing is a radial bearing.

In still another refinement, the fulcrum is configured to offset the housing from the bearing pilot feature a predetermined distance selected to limit an angular position change of the housing.

In yet still another refinement, the angular position change of the housing is limited by contact of the housing with the bearing pilot feature.

In a further refinement, the predetermined radial frictional damping characteristic is selected to limit a dynamic excursion of the housing.

In a yet further refinement, the fulcrum is configured to form a pivot for the housing for pivoting the housing relative to the bearing pilot feature.

In a still further refinement, the spring is configured to prevent angular motion until predetermined frictional forces are exceeded.

Embodiments of the present invention include a self-aligning foil bearing system for a machine, comprising: a foil bearing operative to transmit rotor loads from a rotor of the machine to another component of the machine; and axial means for aligning the foil bearing with an axis of rotation of the rotor.

In a refinement, the foil bearing system further comprises means for limiting a dynamic excursion of the rotor.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
a compressor;
a turbine;
a static structure having a bearing pilot feature configured to pilot a bearing system; and
a self-aligning foil bearing system operative to transmit rotor loads from at least one of the compressor and the turbine to the static structure, wherein the foil bearing system includes:
a foil bearing;
a housing configured to receive the foil bearing and configured to be at least partially received within the bearing pilot feature;
a fulcrum extending outward from the housing toward the bearing pilot feature; and
an axial spring configured to impart an axial load on the housing and to generate a predetermined radial frictional damping characteristic of the housing,
wherein the self-aligning foil bearing system is operative to align the foil bearing with an axis of rotation of the at least one of the compressor and the turbine.

2. The gas turbine engine of claim 1, wherein the fulcrum is positioned in a central portion of the housing.

3. The gas turbine engine of claim 1, wherein the fulcrum is configured to offset the housing from the bearing pilot feature a predetermined distance.

4. The gas turbine engine of claim 3, wherein the predetermined distance is selected to limit an angular position change of the housing.

5. The gas turbine engine of claim 4, wherein the angular position change of the housing is limited by contact of the housing with the bearing pilot feature.

6. The gas turbine engine of claim 1, wherein the predetermined radial frictional damping characteristic is selected to limit a dynamic excursion of the housing.

7. The gas turbine engine of claim 1, wherein the fulcrum is configured to form a pivot for the housing for pivoting the housing relative to the bearing pilot feature.

8. The gas turbine engine of claim 1, wherein the axial spring is configured to prevent angular motion until predetermined frictional forces are exceeded.

9. The gas turbine engine of claim 1, wherein the bearing pilot feature is a cylindrical opening in the static structure.

10. A machine, comprising:
a rotor;
a component having a bearing pilot feature;
a self-aligning foil bearing system operative to transmit rotor loads from the rotor to the component, wherein the foil bearing system includes:
a foil bearing;
a housing configured to receive the foil bearing and configured to be at least partially received within the bearing pilot feature;
a fulcrum disposed between the housing and the bearing pilot feature;
a first spring configured to impart a load on the housing and to generate a predetermined frictional damping characteristic of the housing; and
a second spring configured to act on the housing oppositely to the first spring,
wherein the self-aligning foil bearing system is operative to align the foil bearing with an axis of rotation of the rotor and the second spring is spaced apart from the first spring to locate the fulcrum between the first spring and the second spring.

11. The machine of claim 10, wherein the housing has a first face and a second face; and wherein the first spring acts against the first face and the second spring acts against the second face.

12. The machine of claim 10, wherein the foil bearing is a radial bearing.

13. The machine of claim 10, wherein the fulcrum is configured to offset the housing from the bearing pilot feature a predetermined distance selected to limit an angular position change of the housing.

14. The machine of claim 13, wherein the angular position change of the housing is limited by contact of the housing with the bearing pilot feature.

15. The machine of claim 10, wherein the predetermined radial frictional damping characteristic is selected to limit a dynamic excursion of the housing.

16. The machine of claim 10, wherein the fulcrum is configured to form a pivot for the housing for pivoting the housing relative to the bearing pilot feature.

17. The machine of claim 10, wherein the spring is configured to prevent angular motion until predetermined frictional forces are exceeded.

18. A gas turbine engine, comprising:
a compressor;
a turbine;
a static structure having a bearing pilot feature configured to pilot a bearing system; and
a self-aligning foil bearing system operative to transmit rotor loads from at least one of the compressor and the turbine to the static structure, wherein the foil bearing system includes:

a foil bearing;

a housing configured to receive the foil bearing and configured to be at least partially received within the bearing pilot feature;

a first axial spring configured to impart an axial load on the housing and to generate a predetermined radial frictional damping characteristic of the housing; and a fulcrum disposed between the housing and the bearing pilot feature, wherein the fulcrum is configured to pivot relative to the static structure to cause the housing to pivot relative to the static structure.

19. The gas turbine engine of claim 18, further comprising a second axial spring configured to act on the housing oppositely to the first axial spring and the second axial spring is spaced apart from the first axial spring to locate the fulcrum between the first axial spring and the second axial spring.

20. The gas turbine engine of claim 19, wherein the fulcrum extends outward from the housing toward the static structure.

* * * * *